Burton Vernooy &
Cornelis Boshuizen
INVENTORS

Burton Vernooy &
Cornelis Boshuizen
INVENTORS

United States Patent Office 3,544,136
Patented Dec. 1, 1970

3,544,136
SPLIT T
Burton Ver Nooy, Broken Arrow, and Cornelis Boshuizen, Tulsa, Okla., assignors to T. D. Williamson, Inc., Tulsa, Okla.
Filed Aug. 1, 1968, Ser. No. 749,516
Int. Cl. F16l 41/00
U.S. Cl. 285—156                    8 Claims

ABSTRACT OF THE DISCLOSURE

A split T comprising a pair of hemispherical bodies each being of substantially the same radius and having a pair of generally semicircular recesses along its edge. The recesses are adapted to fit closely around the pipeline to disposed the edges of the bodies adjacent one another to permit bodies to be secured to one another and to the pipeline, as by welding. One of the bodies has an opening through it for access to the pipeline, and a tubular member is fixed to the one body and extends from the opening. A hot tapping machine may be connected to the tubular member to enable a cutter or the like to be extended through the opening to cut a coupon from the pipeline and thus form a lateral opening in it.

---

This invention relates to an improved split T of the type adapted to be mounted around a pipeline for use in forming a lateral opening therein, and particularly in hot tapping the line—i.e., forming the opening while the line is in service.

The lateral opening in the pipeline has many possible uses well known in the art, such as to permit various tools to be moved into and out of the pipeline and to establish fluid communication between the pipeline and a conduit connecting with the T. An example of such a tool is the plugger shown and described in U.S. Pat. No. 3,025,885.

The conventional split T comprises longitudinally split bodies which are secured to one another and around the line, and a tubular member fixed to one such body and extending from an opening in it. The tubular member has a flange or the like to support a valve and a hot tapping machine, so that a cutter on the machine may be extended through the tubular member and opening in order to cut a coupon from the line and thus form the lateral opening therein.

Upon withdrawal of the cutter to remove the coupon into the machine beyond the valve, the latter may be closed and the machine removed for use at another location. Additional equipment may be connected to the valve mounted on the tubular member for use in moving a tool through the lateral opening in the pipeline, as shown for example in the aforementioned patent.

Conventionally, the longitudinally split bodies of the T are semi-cylindrical and adapted to be welded together into a tube having an inner diameter for fitting closely around the outer diameter of the pipeline. In many areas, these shapes are not available in the desired size so that they must be rolled from plates. Also, in order to withstand the high pressures encountered in many pipelines, the plate must be relatively thick.

Furthermore, the opening in one body of the T for connection with the tubular member is elliptical or sinusoidal in shape, which not only complicates cutting of the opening, but also welding of the tubular member to the body. Still further, the cylindrical T can be placed only around portions of the line which are essentially round and of a constant outer diameter. Thus, its installation at a particular location along the line may require that one or more welds on the line first be ground off.

Still further problems arise when these conventional split T's are used in environments, such as those illustrated in the above mentioned U.S. patent, where the tubular member is of the same inner diameter as the pipeline. In such a case, high stresses are set up at the connection of the tubular member to cylindrical body of the T.

Although some conventional split T's have additional side outlets for various purposes, such as fluid connection with the pipeline when it has been tapped, these require special construction. More particularly, the bodies are outwardly enlarged to permit free fluid communication about the portion of the line surrounded by the bodies.

An object of this invention is to provide a split T which is less expensive to construct.

Another object is to provide such a T which is constructed of more readily available prefabricated parts.

A further object is to provide such a T in which the parts thereof may be made of thinner material, without a sacrifice in pressure containing capacity.

Still another object is to provide such a T which does not require complicated cuts or welds.

Yet another object is to provide a split T which is more flexible insofar as its placement about the line is concerned.

Yet a further object is to provide a split T in which the stresses at the connection of the tubular member to the body adapted to surround the pipeline are lowered, even in those cases which require that the inner diameter of the tubular member be substantially as large as that of the pipeline.

A still further object is to provide a split T in which an additional side outlet may be provided without basic alterations in the construction of its remaining parts.

These and other objects are accomplished, in accordance with the illustrated embodiments of the invention, by a split T in which the longitudinally split or separated bodies are hemispherical in shape. More particularly, each such body has a pair of recesses along its edge which are adapted to fit closely around the pipeline to enable the edges of the bodies to be moved into closely adjacent positions for connection to one another and to the pipeline. One of the bodies has an opening through it for access to the pipeline, and a tubular member is fixed to the one body and extends from this opening, whereby suitable equipment may be connected to such member for use in tapping the pipeline.

Spheres from which the hemispherical bodies may be formed are readily available in various sizes and wall thickness, so that there is no need for shaping these bodies, as is often necessary in the manufacture of conventional split T's. Also, since spherical shapes inherently possess greater presure holding capacity than tubular shapes, the bodies may be made of thinner and therefore less expensive material. Furthermore, due to the shape of each body, the one or more openings to be formed in them require simple flat cuts and thus uncomplicated welds.

Since each body closely surrounds the pipe only along the edge of its recess, rather than along its entire length, the placement of the T on the line is practically unlimited. Still further, due to their relative diameters, the stresses at the connection of the tubular member to one of the hemispherical bodies are relatively low, even when the inner diameter of such member is substantially the same as the inner diameter of the pipeline.

In one illustrated embodiment of the split T, the axis of the tubular member extends substantially perpendicularly to the plane of its edge. Alternatively, as shown in another illustrated embodiment, this axis may extend at an acute angle to the plane of the edge of the body. By this simple expedient, another tubular member may be fixed to the other body so as to extend from an opening in such other body at approximately a right angle to the first mentioned tubular member. Due to the spherical shape of the T, this latter opening will be fluidly connected to the opening to be formed in the pipeline and a conduit connected to the side outlet.

In the drawings, wherein like reference characters are used throughout to designate like parts:

Figure 1:
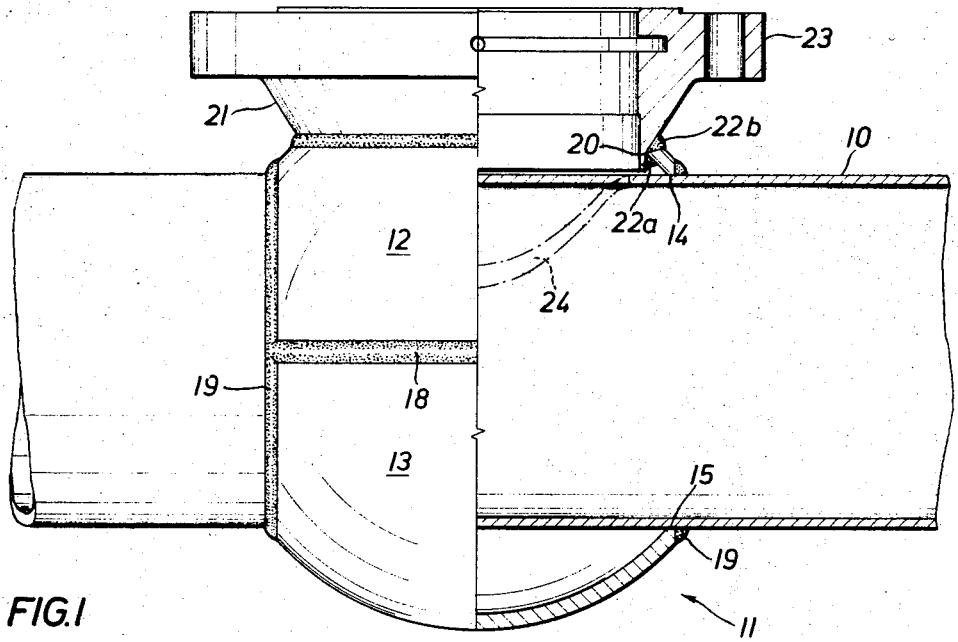
FIG. 1 is a side view, partly in elevation and partly in section, of the first mentioned embodiment of the invention installed upon a pipeline for use in forming a lateral opening in the line.
Figure 2:
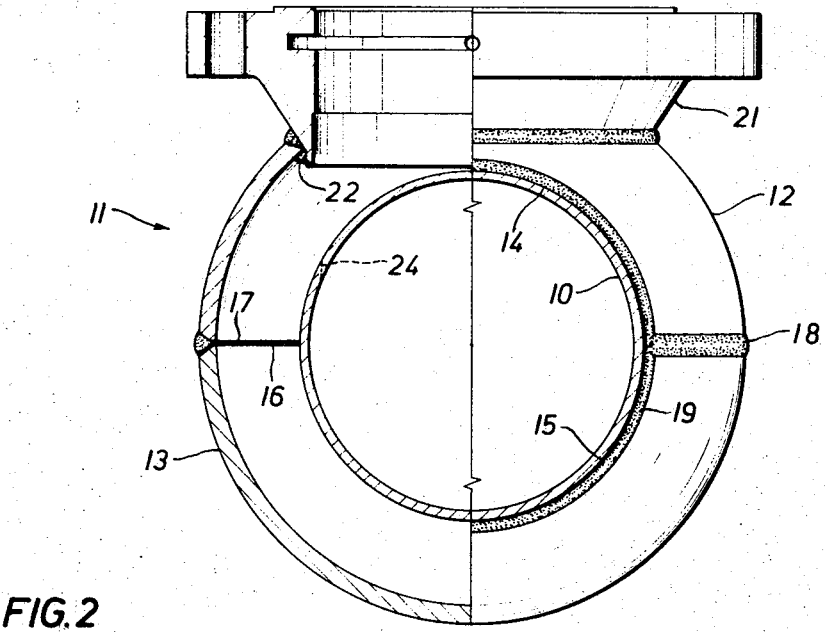
FIG. 2 is an end view of the split T and pipeline of FIG. 1, also shown, partly in section and partly in elevation.

Turning now to a detailed description of the drawings, the split T illustrated in FIGS. 1 and 2 as being installed upon a pipeline 10 is designated in its entirety by reference character 11. As previously described, this T comprises a pair of hemispherical bodies 12 and 13, each being of substantially the same radius and having a pair of coaxial, semicircular recesses 14 and 15, respectively, along its edge for fitting closely around the pipeline 10. More particularly, when the bodies 12 and 13 are so fitted, their longitudinal edges 16 and 17, respectively, are disposed adjacent to one another. Thus, in the installation of the T 11 on the pipeline 10, the edges 16 and 17 may be secured to one another by means of longitudinal welds 18 and the edges of the recesses 14 and 15 secured to the pipe by means of peripheral welds 19.

The body 12 also has a lateral opening 20 formed therein with its axis extending perpendicularly to the recesses 14 in such body. A tubular member 21 is secured to the body 12 so as to extend coaxially of this opening, and thus at a right angle to the axis of the pipeline 10 when the T is installed thereon. More particularly, the inner end of the tubular member fits within the lateral opening 20 and is welded thereto by means of internal and external welds 22a and 22b, respectively.

As shown, this inner end of member 21 extends to a level close to the upper ends of the recesses 14 so that it will be substantially adjacent the pipeline 10 upon installation of the T. Thus, tools such as the plugger shown in U.S. Pat. No. 3,025,885 are provided with adequate support as they move into and out of the pipeline.

The tubular member 21 has a flange 23 on its upper end for connection with a hot tapping machine of a type well-known in the art. When this machine is mounted on the flange, its housing forms a sealed vessel with the T 11, whereby on opening may be formed in the pipeline, as indicated in broken lines at 24, while the line is in service. For this purpose, a cutter on the machine may be extended through its housing and the tubular member 21 for cutting a coupon in the pipeline, and then removing same, as previously described, so as to form the opening 24.

The T 11 is preferably made from a prefabricated sphere. Thus, flat cuts may be made along parallel planes on opposite sides of the sphere so as to form openings which provide the recesses in the bodies 12 and 13. Another flat cut may be made along a plane perpendicular to the first mentioned planes so as to form the lateral opening 20 in the body 12. The sphere is then separated along a diameter perpendicular to the first mentioned cuts and parallel to the cut forming lateral opening 20 to separate it into the bodies 12 and 13.

The edges of the bodies 12 and 13 are beveled as shown in FIG. 2 to facilitate making of the weld 18. The inner edges of the recesses 14 and 15 are also finished to provide annular surfaces for fitting closely around the pipeline and facilitating making of the weld 19. The surface surrounding the lateral opening 20 may also be finished in any suitable manner to facilitate its welding to the tubular member 21.

Figure 3:
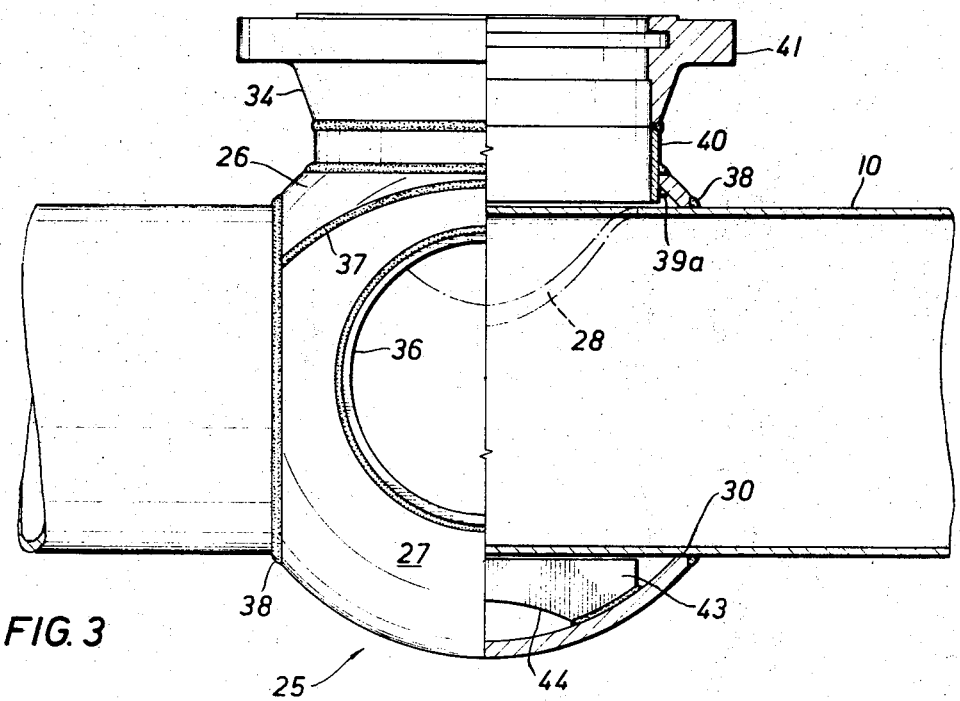
FIG. 3 is a side view, similar to FIG. 1, of the second described embodiment of the invention.
Figure 4:
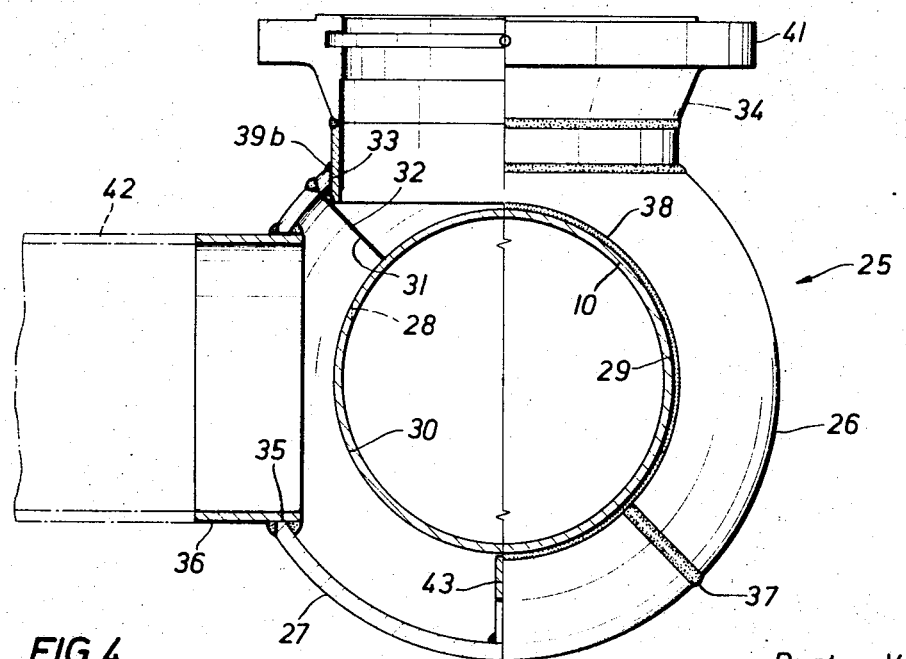
FIG. 4 is an end view, similar to FIG. 2, of the second embodiment of the invention.

The split T which is illustrated in FIGS. 3 and 4, and designated in its entirety by reference character 25, also comprises a pair of hemispherical bodies 26 and 27 adapted to be secured around the pipeline and to one another for use in forming a lateral opening 28 in the pipeline. In this embodiment of the invention, as in the case of the T 11, each body 26 and 27 has a pair of semicircular recesses 29 and 30, respectively, for fitting closely around the pipeline so as to dispose the longitudinal edges 31 and 32, respectively, of the bodies adjacent one another.

However, in the T 25, a lateral opening 33 is so formed in one body 26 that its axis extends at an acute angle with respect to the axis of the recesses 29, and, more particularly, at an angle of approximately 45° with respect thereto. Thus, when secured to the body 26 in alignment with the opening 33, the tubular member 34 extends from such body near the longitudinal edge thereof.

As will be apparent from the drawings, this permits a second lateral opening 35 to be formed in the other body 27 near its longitudinal edge and along an axis forming a right angle with the axis of opening 33. In this way, when secured to the body 27 in alignment with the axis of opening 35, a second tubular member 36 extends from such body in a direction parallel to the pipeline 10, which is often desired or required.

As shown in FIGS. 3 and 4, the adjacent edges 31 and 32 of the bodies 26 and 27 are beveled and then secured to one another by a weld 37. Similarly, the inner edges of the recesses 29 and 30 in the bodies are finished to facilitate formation of peripheral welds 38 securing opposite ends of the T to the pipeline.

Furthermore, the tubular member 34 is a good deal similar to the member 20 of the T 11 in that it has an inner end which extends into the lateral opening 33 in the body 26 and is secured to such body by internal and external welds 39a and 39b. The member 34 differs somewhat from the member 21 in that its lower end comprises a tube 40 welded to the lower end of flange 41 at its upper end. However, as in the case of tubular member 21, the lower end of tube 40 extends close to the upper level of recesses 29 for disposal substantially adjacent the pipeline 10.

As shown in FIG. 4, the second lateral opening 35 is finished to provide an annular surface for closely receiving the tubular member 36 and facilitating its welding to the body 27. The member 36 is in turn adapted for connection with a side outlet 42 (shown in broken lines).

Upon forming the lateral opening 28 in the pipeline, in any manner well-known in the art and described briefly in connection with the embodiment of FIGS. 1 and 2, fluid communication is provided between pipeline 10 and the tubular member 36, and thus side outlet 42 to be connected therewith. Thus, as is obvious from FIG. 4 of the drawings, the spherical shape of the T bodies provides free and unobstructed communication between the pipeline and this side outlet.

As also shown in FIGS. 3 and 4, a bar 43 is secured across the lower portion of the body 27 to reinforce the unsupported portion of the pipeline 10 beneath the lateral opening 28. This may be useful in preventing collapse of the pipeline at this location upon insertion of various tools through the tubular member 34 and into the pipeline, which tools are so designed as to bear against the unsupported length of the pipeline opposite the opening 28, as in the case, for example, of the plugger shown and described in the above mentioned U.S. patent. As best shown in FIG. 3, a recess 44 is provided along the lower edge of the bar 43 so as to facilitate fluid communication between the pipeline opening 28 and the tubular member 36.

The T 25 may be fabricated from a sphere in much the same manner as the T 11. Thus, flat cuts may be made along parallel planes on opposite sides of a sphere to form openings for providing the recesses 29 and 30, and another flat cut may be made along a plane perpendicular to the first mentioned cuts to provide the opening 40. However, in fabrication of the T 25, a second lateral opening 35 is provided by a further flat cut along a plane perpendicular to the plane of the cut providing the opening 33. The sphere is then divided along a plane extending at 45° to the axes of the openings 33 and 35 so as to form the bodies 26 and 27 having the recesses 29 and 30 shown and described above in connection with FIGS. 3 and 4. At this time, of course, the tubular members 34 and 36 are assembled and secured to the bodies 26 and 27, respectively.

From the foregoing it will be seen that this invention is one well adapted to attain all of the ends and objects hereinabove set forth, together with other advantages which are obvious and which are inherent to the apparatus.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

The invention having been described, what is claimed is:

1. A split T adapted to be mounted around a pipeline for use in forming an opening therein, comprising a pair of hemispherical bodies for disposal over opposite sides of the pipeline, each body being of substantially the same radius and having a pair of generally semi-circular recesses in the edge thereof, each recess being of the same radius for fitting closely around the pipeline so as to dispose the edges of said bodies in positions adjacent to one another, one of said bodies having an opening therethrough for access to the pipeline, and a tubular member fixed to said one body and extending from said opening for connection to equipment adapted to extend through said opening in order to form the opening in the pipeline.

2. A split T of the character defined in claim 1, wherein the axis of the opening in said one body extends substantially perpendicularly to the plane of the edge thereof.

3. A split T of the character defined in claim 1, wherein the axis of the opening in said one body extends at an acute angle to the plane of the edge thereof, said other body has an opening formed therethrough along an axis substantially perpendicular to the axis of the opening in said one body, and a tubular member is fixed to said other body and extending from the opening therethrough.

4. A split T of the character defined in claim 1, wherein the axes of the recesses in each member are aligned with one another.

5. A split T of the character defined in claim 1, including a bar extending across the interior of the other body opposite the opening through the one member.

6. A split T of the character defined in claim 1, wherein said tubular member extends through said opening for disposal substantially adjacent the pipeline.

7. A split T of the character defined in claim 1, wherein the inner diameter of the tubular member is substantially the same as that of the pipeline.

8. A split T adapted to be mounted around a pipeline for use in forming an opening therein, comprising a pair of hemispherical bodies for disposal over opposite sides of the pipeline, each body being of substantially the same radius and having a pair of recesses in the edge thereof, each recess in each body being of the same size as one of the recesses in the other body for fitting closely around the pipeline so as to dispose the edges of said bodies in positions adjacent to one another, one of said bodies having an opening therethrough for access to the pipeline, and a tubular member fixed to said one body and extending from said opening for connection to equipment adapted to extend through said opening in order to form the opening in the pipeline.

References Cited

UNITED STATES PATENTS

| | | | |
|---|---|---|---|
| 685,876 | 11/1901 | Shields | 285—150 X |
| 875,729 | 1/1908 | O'Brien | 285—373 X |
| 2,664,098 | 12/1953 | McInerney | 285—150 X |
| 2,916,308 | 12/1959 | Voldrich et al. | 285—156 X |
| 3,186,431 | 6/1965 | Moore | 285—156 X |

FOREIGN PATENTS

| | | | |
|---|---|---|---|
| 77,359 | 9/1948 | Czechoslovakia | 285—156 |
| 1,022,858 | 1/1958 | Germany | 285—156 |

DAVE W. AROLA, Primary Examiner

U.S. Cl. X.R.

285—286, 419